(12) United States Patent
Kalaichelvan et al.

(10) Patent No.: US 11,616,997 B2
(45) Date of Patent: Mar. 28, 2023

(54) METHODS AND SYSTEMS FOR TRICK PLAY USING PARTIAL VIDEO FILE CHUNKS

(71) Applicant: ARRIS Enterprises LLC, Suwanee, GA (US)

(72) Inventors: Kaliraj Kalaichelvan, San Diego, CA (US); William P. Franks, San Diego, CA (US); Mark Schmidt, San Diego, CA (US); Beena Devadathan, San Diego, CA (US); Rajesh Kechal Rao, San Marcos, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 87 days.

(21) Appl. No.: 17/116,290

(22) Filed: Dec. 9, 2020

(65) Prior Publication Data

US 2021/0185366 A1    Jun. 17, 2021

Related U.S. Application Data

(60) Provisional application No. 63/046,554, filed on Jun. 30, 2020, provisional application No. 62/947,134, filed on Dec. 12, 2019.

(51) Int. Cl.
*H04N 21/2387* (2011.01)
*H04N 21/6587* (2011.01)
(Continued)

(52) U.S. Cl.
CPC ..... *H04N 21/2387* (2013.01); *H04N 21/2187* (2013.01); *H04N 21/2402* (2013.01); *H04N 21/2662* (2013.01); *H04N 21/6587* (2013.01)

(58) Field of Classification Search
CPC ........... H04N 21/2387; H04N 21/2187; H04N 21/2402; H04N 21/2662; H04N 21/6587;
(Continued)

(56) References Cited

U.S. PATENT DOCUMENTS 7,170,938 B1 * 1/2007 Cote ................. H04N 19/40
375/240.03
8,407,747 B1 * 3/2013 Inskip ............... H04N 21/2393
725/90
(Continued)

FOREIGN PATENT DOCUMENTS

KR    10-2012-0088148 A    8/2012
WO    WO-2005055238 A1 *  6/2005    ......... H04N 21/2393

OTHER PUBLICATIONS

Notification of Transmittal of the International Search Report (Forms PCT/ISA/220 and PCT/ISA/210) and the Written Opinion of the International Searching Authority (Form PCT/ISA/237) dated Mar. 26, 2021, by the International Application Division Korean Intellectual Property Office in corresponding International Application No. PCT/US2020/063886. (10 pages).

(Continued)

*Primary Examiner* — Ngoc K Vu
(74) *Attorney, Agent, or Firm* — Panitch Schwarze Belisario & Nadel LLC (57) ABSTRACT

A method, system, and computer program product for trick play using partial video file chunks includes a processor to retrieve the selected video file from an HLS server, the video file having a plurality of video chunks, and each one of the video chunks beginning with an I-frame. The processor may determine an average size of the plurality of I-frames. The average I-frame size may be based on a bitrate speed of the video file. The processor may retrieve a portion equal to the average I-frame size of from the beginning of each one of the plurality of chunks of the video. The processor may (Continued)

receive a begin trick play request of the selected video and initiate trick play of the selected video. The trick play of the video includes displaying each portion of each one of the plurality of chunks of the video.

20 Claims, 6 Drawing Sheets

(51) Int. Cl.
  *H04N 21/2662* (2011.01)
  *H04N 21/2187* (2011.01)
  *H04N 21/24* (2011.01)
(58) Field of Classification Search
  CPC ........... H04N 21/8456; H04N 21/2353; H04N 21/2393; H04N 21/234381; H04N 21/47217; H04N 21/23439
  See application file for complete search history.

(56) References Cited

U.S. PATENT DOCUMENTS

| | | | |
|---|---|---|---|
| 2008/0075419 A1 | 3/2008 | Okubo et al. | |
| 2014/0337904 A1* | 11/2014 | Panje | H04N 21/26258 725/90 |
| 2014/0380376 A1* | 12/2014 | Schmidt | H04N 21/266 725/54 |
| 2016/0134945 A1 | 5/2016 | Gower et al. | |
| 2018/0027039 A1* | 1/2018 | Moorthy | H04N 21/4621 709/219 |

OTHER PUBLICATIONS

Int'l Preliminary Report on Patentability dated Jun. 23, 2022 in Int'l Application No. PCT/US2020/063886.

* cited by examiner

METHODS AND SYSTEMS FOR TRICK PLAY USING PARTIAL VIDEO FILE CHUNKS

FIELD OF THE INVENTION

The present invention relates generally to a method, system, and computer program product for trick play using partial video file chunks, and more particularly to enabling trick play operation in the absence of an I-frame playlist in an HTTP Live Streaming (HLS) master playlist.

BACKGROUND OF THE INVENTION

The streaming of video content to personal devices has become increasingly popular in recent years. HTTP Live Streaming (HLS) is an HTTP-based adaptive bitrate streaming communication protocol in which content, such as a video, being streamed to a device is broken down into a series of small HTTP-based file downloads, also called "chunks," instead of being streamed as a single large download. Streaming HLS based content, such as movies, television shows, and other over-the-top (OTT) content, etc. to a digital set-top box (STB) provides the flexibility of re-using, e.g. re-watching, the OTT content on demand. However, current methods and systems of achieving a STB style trick-rate based play, e.g. fast-forwarding and rewinding, require downloading the chunks on a constrained network at a much higher speed. Alternatively, current methods and systems require the availability and downloading of an I-frame playlist as part of HLS. Thus, there is a need for a technical solution for enabling trick play of HLS-based content when no I-frame playlists are available.

SUMMARY OF THE INVENTION

The present disclosure provides a description of exemplary methods, systems, and computer program products for trick play using partial video file chunks. The methods, systems, and computer program products may include a processor which can retrieve the selected video file from an HLS server, the video file having a plurality of video chunks, and each one of the video chunks beginning with an I-frame. The processor may determine an average size of the plurality of I-frames. The average !-frame size may be based on a bitrate speed of the video file. The processor may retrieve a portion equal to the average I-frame size of from the beginning of each one of the plurality of chunks of the video. The processor may receive a begin trick play request of the selected video and initiate trick play of the selected video. The trick play of the video includes displaying each portion of each one of the plurality of chunks of the video.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure

DETAILED DESCRIPTION OF THE PREFERRED EMBODIMENTS AND METHODS

The present disclosure provides a novel solution for trick play using partial video file chunks. Current trick play solutions for OTT content require downloading chunks of the OTT content on a constrained network at a much higher speed or the availability and downloading of an I-frame playlist as part of HLS. Thus, there is a need for a technical solution for enabling trick play of HLS-based content when no I-frame playlists are available. The methods, systems, and computer program products herein provide a novel solution, not addressed by current technology, by enabling trick play operation in the absence of an I-frame playlist in an HTTP Live Streaming (HLS) master playlist. Exemplary embodiments of the methods, systems, and computer program products provided for herein determine an average size of a plurality of I-frames for a selected video file and then retrieve a portion of the beginning of each chunk of the video file corresponding to the average I-frame size. Further, exemplary embodiments of the methods, systems, and computer program products provided for herein then initiate trick play of the selected video file by displaying each portion of each of the chunks of the selected video. Thus, the methods, systems, and computer program products provided for herein provide a novel way for trick play using partial video chunks.

System for Trick Play Using Partial Video Chunks

Figure 1A:
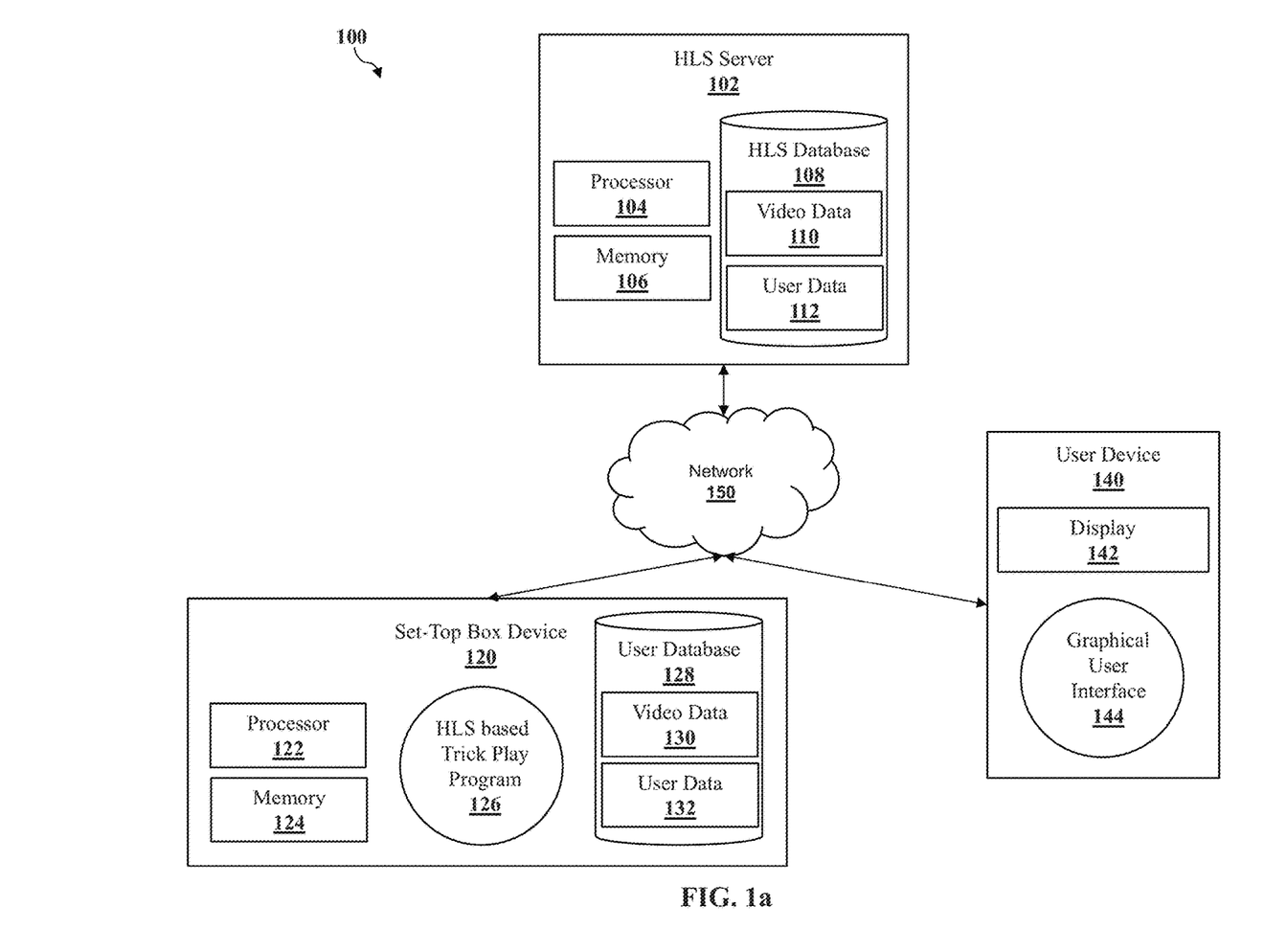
FIG. 1a is a block diagram that illustrating a high-level system architecture for trick play using partial video file chunks in accordance with exemplary embodiments.

FIG. 1a illustrates an exemplary system 100 for trick play using partial video chunks. The system 100 includes an HTTP Live Streaming (HLS) Server 102, set-top box (STB) device 120, and user device 140 communicating via a network 150.

The HLS server 102 includes, for example, a processor 104, a memory 106, and an HLS database 108. The HLS server 102 may be any type of electronic device or computing system specially configured to perform the functions discussed herein, such as the computing system 500 illustrated in FIG. 5. Further, it can be appreciated that the HLS server 102 may include one or more computing devices. In an exemplary embodiment of the system 100, the HLS server 102 is a server associated with any media services provider providing an HLS service.

The processor 104 may be a special purpose or a general purpose processor device specifically configured to perform the functions discussed herein. The processor 104 unit or device as discussed herein may be a single processor, a plurality of processors, or combinations thereof. Processor devices may have one or more processor "cores." In an exemplary embodiment, the processor 104 is configured to perform the functions associated with the modules of the HLS based trick play program 126 as discussed below with reference to FIGS. 2-4.

The memory 106 can be a random access memory, read-only memory, or any other known memory configurations. Further, the memory 106 can include one or more additional memories including the HLS database 108 in some embodiments. The memory and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the HLS based trick play program 126. Computer programs, e.g., computer control logic, can be stored in the memory 106.

The HLS database 108 can include video data 110 and user data 112. The HLS database 108 can be any suitable database configuration, such as a relational database, a structured query language (SQL) database, a distributed database, or an object database, etc. Suitable configurations and storage types will be apparent to persons having skill in the relevant. In an exemplary embodiment of the system 100, the HLS database 108 stores video data 110 and user data 112. The video data 110 can be any video file such as, but not limited to, movies, television episodes, music videos, or any videos capable of being live streamed using an HLS protocol. Further, the video data 110 may be any suitable video file format such as, but not limited to, .WEBM, .MPG, .MP2, .MPEG, .MPE, .MPV, .OGG, .MP4, .M4P, .M4V, .AVI, .WMV, .MOV, .QT, .FLV, .SWF, and AVCHD, etc. The video data 110 can also include various bitrate streams for each of the video files, which allow a user to download different bitrate streams of a video file depending on the bandwidth between the HLS server 102 and the STB device 120. The various bitrate streams for a video file may be stored in a master playlist file associated with each of the video files. For example, three versions of a single movie may be stored in the HLS database 108 in a master playlist with each version being a different bitrate stream of the movie. Further, the video files may be stored in the video data 110 as chunks, e.g. a series of smaller data files. The video data 110 can include an I-frame playlist for each of the video files stored in the HLS database 108. An I-frame playlist is a playlist of video frames of a video that are encoded independent of any other frame in the video. For example, each chunk of a video file stored in the video data 110 may start with an I-frame and the I-frame playlist will comprise each I-frame from each chunk. In an exemplary embodiment, the video data 110 may be selected by a user on the user device 140 via the STB device 120 and displayed on the display 142 of the user device 140. However, in an exemplary embodiment, the I-frame playlist may be unavailable. The user data 112 may be any data associated with the STB device 120 and/or the user device 140 including, but not limited to, user account information (e.g. user login name, password, preferences, etc.), input data received from the user device 120 to be displayed in association with a video file via the graphical user interface 144, etc.

The set-top box (STB) device 120 can include a processor 122, a memory 124, an HLS based trick play program 126, and a user database 128. While the STB device 120 and the user device 140 are illustrated as separate devices, it can be appreciated that the STB device 120 and the user device 140 can be the same device. The STB device 120 may be any type of electronic device or computing system capable of receiving and decoding the video data 110 from the HLs server 102 and displaying the video data 110 on other computing devices such as, but not limited to the user device 140 via the network 150.

The processor 122 may be a special purpose or a general purpose processor device specifically configured to perform the functions discussed herein. The processor 122 unit or device as discussed herein may be a single processor, a plurality of processors, or combinations thereof. Processor devices may have one or more processor "cores." In an exemplary embodiment, the processor 122 is configured to perform the functions associated with the modules of the HLS based trick play program 126 as discussed below with reference to FIGS. 1b-4.

The memory 124 can be a random access memory, read-only memory, or any other known memory configurations. Further, the memory 124 can include one or more additional memories including the User database 128 in some embodiments. The memory and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the HLS based trick play program 126. Computer programs, e.g., computer control logic, can be stored in the memory 124.

The user database 128 can include video data 130 and user data 132. The user database 128 can be any suitable database configuration, such as a relational database, a structured query language (SQL) database, a distributed database, or an object database, etc. Suitable configurations and storage types will be apparent to persons having skill in the relevant. In an exemplary embodiment of the system 100, the user database 128 stores video data 130 and user data 132. The video data 130 can be any video file such as, but not limited to, movies, television episodes, music videos, and/or any video capable of being live streamed using an HLS protocol. The video data 130 may be any suitable video file format such as, but not limited to, .WEBM, .MPG, .MP2, .MPEG, .MPE, .MPV, .OGG, .MP4, .M4P, .M4V, .AVI, .WMV, .MOV, .QT, .FLV, .SWF, and AVCHD, etc. Further, the video data 130 contains portions of the same video files as in the video data 110. For example, the vide data 110 can be every video file available through a multiple service operator (MSO) and the video data 130 can be the video files selected by a user from the video data 110. The video data 130 may include, but is not limited to, various bitrate streams of a video file, chunks of a video file, and/or an I-frame playlist associated with a video file as discussed above with reference to video data 110. In an exemplary embodiment, the video data 130 may be selected by a user on the user device 140 via the STB device 120 and displayed on the display 142 of the user device 140. The user data 132 may be any data associated with the STB device 120 and/or the user device 140 including, but not limited to, user account information (e.g. user login name, password, preferences, etc.), input data received from the user device 120 to be displayed in association with a video file via the graphical user interface 144, etc.

Figure 1B:
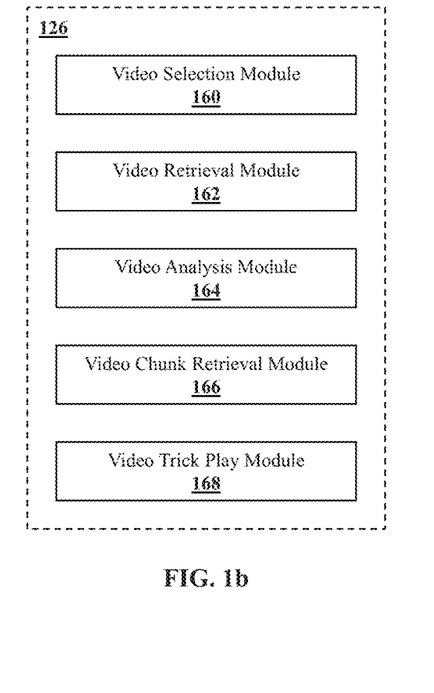
FIG. 1b illustrates example operating modules of the HLS based trick play program of FIG. 1a in accordance with exemplary embodiments.

The HLS based trick play program 126 can include the video selection module 160, the video retrieval module 162, the video analysis module 164, the video chunk retrieval module 166, and the video trick play module 168 as illustrated in FIG. 1b. The HLS based trick play program 126 is a computer program specifically programmed to implement the methods and functions disclosed herein for trick play using partial video chunks when an I-frame playlist for a video file is unavailable. The HLS based trick play program 126 and the modules 160-168 are discussed in more detail below with reference to FIGS. 1b-4.

The user device 140 can include a display 140 and the graphical user interface 144. The user device 140 may be a desktop computer, a notebook, a laptop computer, a tablet computer, a handheld device, a smart-phone, a thin client, or any other electronic device or computing system capable of receiving, transmitting, and displaying audio, visual, or textual data to and from other computing devices, such as the STB device 120 and the HLS server 102 via the network 150. Further, it can be appreciated that the user device 140 may include one or more computing devices. For example, a user may have multiple devices such as, but not limited to, a smart-phone, a tablet, and a laptop computer, which the user may connect to the STB device 120 to watch the video data 130.

The display 142 can be any display capable of receiving display signals from another computing device, such as the user device 140, the STB device 120, and/or the HLS server 102, and outputting those display signals to a display unit such as, but not limited to, a LCD screen, plasma screen, LED screen, DLP screen, CRT screen, etc. While the display 142 is illustrated a part of the user device 140, the components of the user device 140 can be part of the STB device 120.

The graphical user interface 144 can include components used to receive input from the user device 140 and transmit the input to the HLS based trick play program 126, or conversely to receive information from the HLS based trick play program 126 and display the information on the user device 140 via the display 142. In an example embodiment, the graphical user interface 144 uses a combination of technologies and devices, such as device drivers, to provide a platform to enable users of user device 140 to interact with the HLS based trick play program 126. In the example embodiment, the graphical user interface 144 receives input from a physical input device, such as a keyboard, mouse, touchpad, touchscreen, camera, microphone, etc. For example, the graphical user interface 144 may receive a user video file selection from the user device 140.

The network 150 may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. In general, the network 150 can be any combinations of connections and protocols that will support communications between the HLS server 102, the STB device 120, and the user device 140. In some embodiments, the network 150 may be optional based on the configuration of the HLS server 102, the STB device 120, and the user device 140.

Exemplary Method for Trick Play Using Partial Video File Chunks

Figure 2:
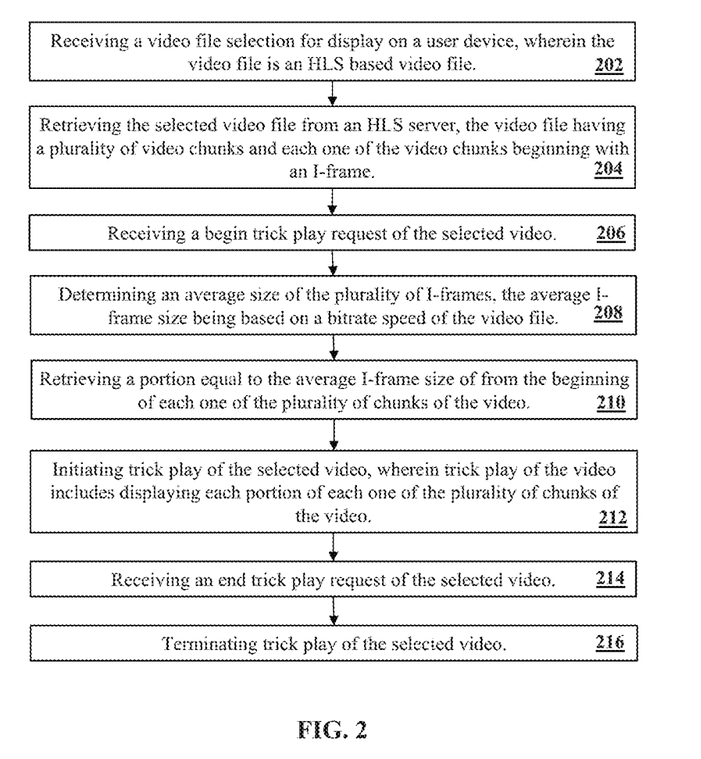
FIG. 2 is a flow chart illustrating exemplary methods for trick play using partial video file chunks in accordance with exemplary embodiments.

FIG. 2 illustrates a flow chart of an exemplary method 200 for trick play using partial video file chunks in accordance with exemplary embodiments.

In an exemplary embodiment, the method 200 can include block 202 for receiving a video file selection from the video data 110 stored on the HLS server 102 for display on the user device 140 via the display 142. The video file may be a video file selected from the video data 110 stored on the HLS database 102 via the graphical user interface 144 by a user on the user device 140. For example, a user on the user device 140 may select a movie stored on the HLS database 108 to view on the user device 140. In an exemplary embodiment the user device 140 may communicate with the HLS server 102 via the STB device 120. For example, a user may interact with the STB device 120 via the graphical user interface 144 to select a video file stored in the HLS database 108 on the HLS server 102. In an exemplary embodiment of the system 100, the video selection module 140 and the video selection module 160 can be configured to execute the method of block 202.

In an exemplary embodiment, the method 200 can include block 204 for retrieving the selected video file from the HLS server 102. In an embodiment, retrieving the selected video file from the HLS server 102 can include determining a bandwidth of the user device and retrieving a version of the selected video file having a bitrate speed based on the user device bandwidth. For example the HLS server 102 may store a plurality of versions of the same video file each version of the video file having a different bitrate speed. The lower the bandwidth of the user device 140, a lower bitrate version of the selected video file will be retrieved from the HLS server 102. The selected video file may be stored on the HLS database 108 in a plurality of chunks, with each chunk beginning with an I-frame, and the selected video file may be retrieved from the HLS database 108 chunk by chunk. In an exemplary embodiment, an I-frame playlist for the selected video file is unavailable. It can be appreciated that the bandwidth of the user device 140 can fluctuate depending on network usage and the HLS based trick play program 126 may periodically determine the bandwidth of the user device 140 and switch which bitrate version of the selected video file is retrieved. In an exemplary embodiment of the system 100, the video retrieval module 162 can be configured to execute the method of block 204.

In an exemplary embodiment, the method 200 can include block 206 for receiving a begin trick play request of the selected video file. The begin trick play request may be, for example, but not limited to, a fast-forward request, or a rewind request in which visual feedback is displayed mimicking the fast-forwarding or rewinding of the video file. The begin trick play request may be received from the user device 140 via the graphical user interface 144. In an exemplary embodiment of the system 100, the video trick play module 168 can be configured to execute the method of block 206.

Figure 3A:
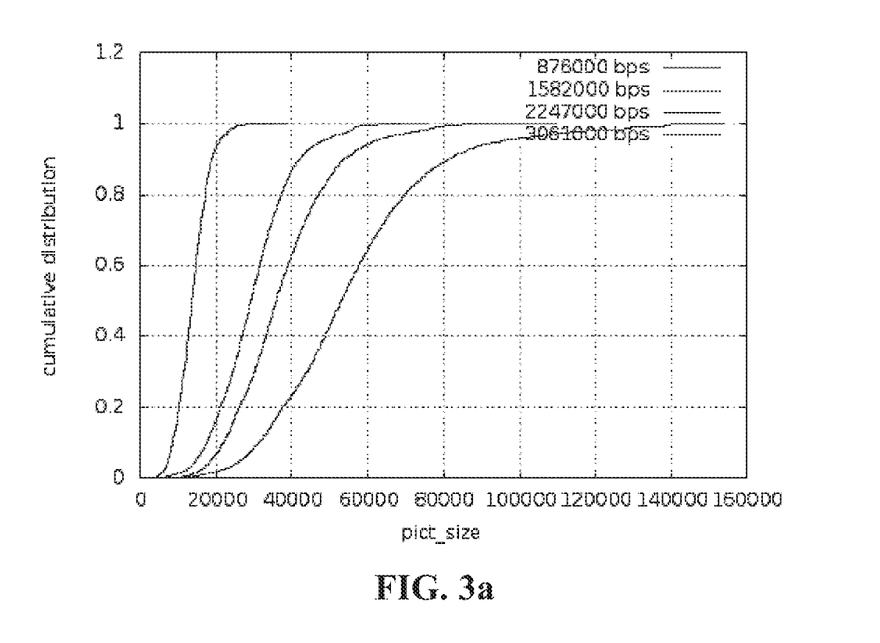
FIG. 3a is a graph illustrating average I-frame bit sizes for a thirty-minute video encoded at various bitrates on a first channel.
Figure 3B:
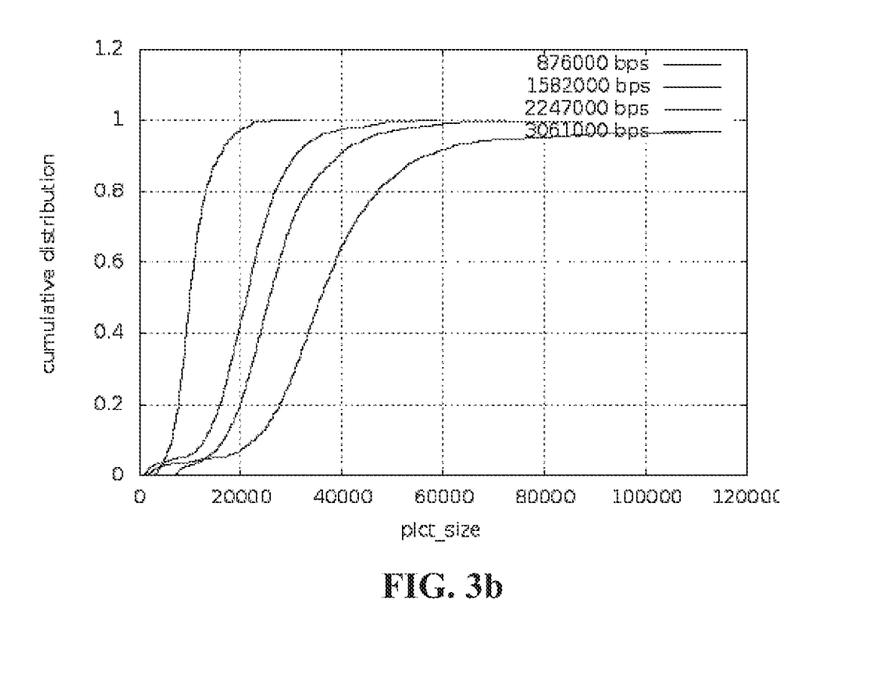
FIG. 3b is a graph illustrating computed average I-frame bit sizes for a thirty-minute video encoded at various bitrates on a second channel.
Figure 4:
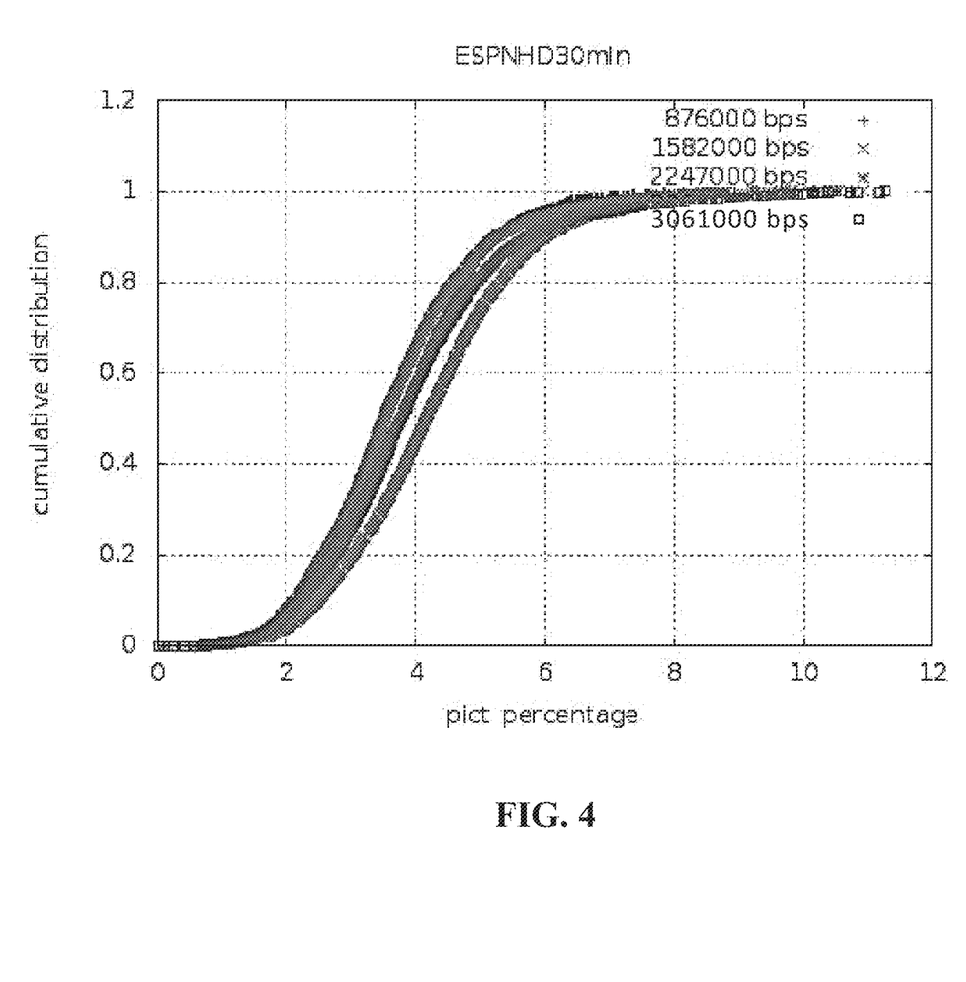
FIG. 4 is a graph illustrating computed average I-frame sizes as percentage of total video chunk bit size for a thirty-minute video encoded at various bitrates on a first channel.

In an exemplary embodiment, the method 200 can include block 208 for determining an average size of the plurality of I-frames of the selected video file. The average I-frame size of the selected video file is based on the bitrate speed of the video file. The average I-frame size of the selected video file can be determined by computing a cumulative distribution function (CDF) for the I-frames of the selected video file. The CDF is based on analyzing the I-frame size for various video files encoded at various bitrates to determine an acceptable size in bytes that needs to be retrieved per chunk of video file to extract the required I-frame. In an exemplary embodiment, the acceptable size per chunk of video file to extract is equal to at least 95% of the actual I-frame size. For example, but not limited to, the CDF can determine the length of each chunk of a video file is four seconds long and therefore the video file contains an I-frame at every four-second interval of the video file. The size of each I-frame of a video file will depend on the bitrate of the video file. For example, FIG. 3a is a chart illustrating the CDF of I-frame sizes for the same thirty-minute video file encoded at four different bitrates, e.g. 876,000 bits/second, 1,582,000 bits/second, 2,247,000 bits/second, and 3,061,000 bits/second. In FIG. 3a, the x-axis of the chart depicts the size in bytes of each chunk and the y-axis depicts the percentage of I-frame captured, i.e. the CDF of the video file. As can be appreciated from FIG. 3a, the higher the bitrate for a video, the larger the size of the I-frames of the video file. FIG. 3b illustrates the same as FIG. 3a for a second video encoded at the same bitrates as the video file of FIG. 3a. FIG. 4 illustrates the CDF of the same video file illustrated in FIG. 3a, but as a percentage of chunk size rather than byte size. Table 1 illustrates the estimated I-frame size based on a computed CDF of the video files of FIGS. 3a-3b and the actual I-frame sizes of the video files.

TABLE 1

| Video Bitrate Speed (bps) | Estimated I-Frame Size (bytes) | Video 1 (FIG. 3a) Actual I-Frame Size (bytes) | Video 2 (FIG. 3b) Actual I-Frame Size (bytes) |
|---|---|---|---|
| 876,000 | 34,342 | 22,000 | 20,000 |
| 1,582,000 | 62,019 | 45,000 | 40,000 |
| 2,247,000 | 88,089 | 62,000 | 55,000 |
| 3,061,000 | 120,000 | 120,000 | 100,000 |

In an exemplary embodiment of the system 100, the video analysis module 164 can be configured to execute the method of block 208.

In an exemplary embodiment, the method 200 can include block 210 for retrieving, from the HLS server 102, a portion equal to the average I-frame size of from the beginning of each one of the plurality of chunks of the video file. For example, if the selected video file is retrieved at a bitrate speed of 3,061,000 bits/second and the average I-frame size is determined to be 120,000 bytes, the first 120,000 bytes of each video file chink would be retrieved from the HLS server 102. In an exemplary embodiment of the system 100, the video chunk retrieval module 166 can be configured to execute the method of block 210.

In an exemplary embodiment, the method 200 can include block 212 for initiating trick play of the selected video file. Trick play of the video includes displaying each portion of each one of the plurality of chunks of the video. For example, the begin trick play request may be a fast-forward request and each portion of the video chunks following a current chunk being viewed by a user will be displayed in fast-forward action. In an exemplary embodiment of the system 100, the video trick play module 168 can be configured to execute the method of block 212.

In an exemplary embodiment, the method 200 can include block 214 for receiving an end trick play request of the selected video file. The end trick play request may be, for example, but not limited to, a play request, a stop request, or a pause request, etc. The end trick play request may be received from the user device 140 via the graphical user interface 144. In an exemplary embodiment of the system 100, the video trick play module 168 can be configured to execute the method of block 214.

In an exemplary embodiment, the method 200 can include block 216 for terminating trick play of the selected video file. Following the previous example, the end trick play request may be a play request and the fast-forwarding of the selected video file is terminated and the selected video file is played at normal speed. In an exemplary embodiment of the system 100, the video trick play module 168 can be configured to execute the method of block 216.

Computer System Architecture

Figure 5:
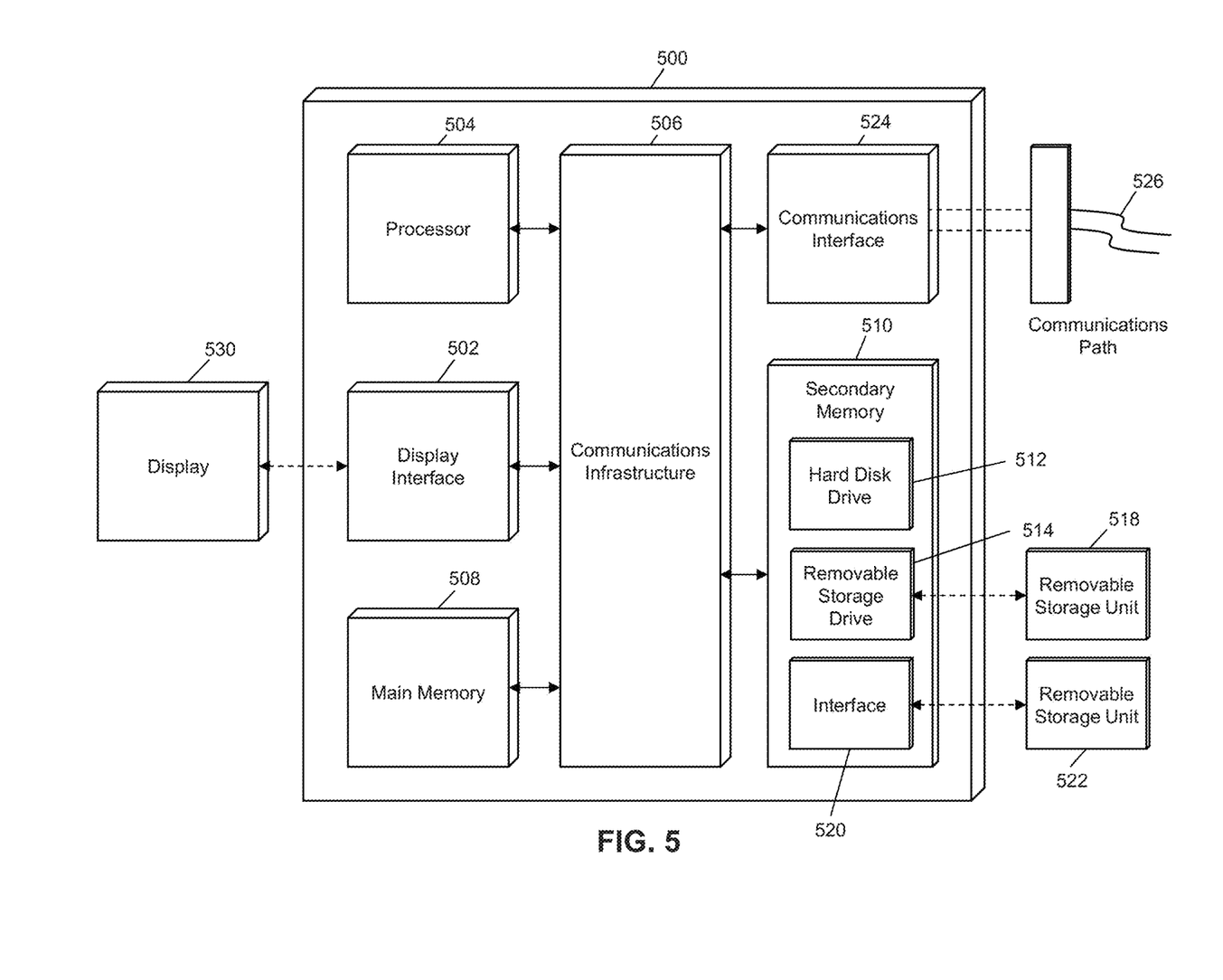
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the HLS server 102, the STB device 120, and the user device 140 of FIG. 1a may be implemented in the computer system 500 using hardware, software executed on hardware, firmware, non-transitory computer readable media having instructions stored thereon, or a combination thereof and may be implemented in one or more computer systems or other processing systems. Hardware, software, or any combination thereof may embody modules, such as the modules 160-188 of FIG. 1b, and components used to implement the methods of FIGS. 3a, 3b, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 304 may be connected to a communications infrastructure 306, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 318 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIG. 2, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines, such as the modules 160-168, configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for authentication of a client device using a hash chain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope

What is claimed is:

1. A method for trick play using partial video file chunks, the method comprising:
 receiving a video file selection for display on a user device, wherein the video file is an HTTP Live Streaming (HLS) based video file;
 retrieving the selected video file from an HLS server, the video file having a plurality of video chunks, and each one of the video chunks beginning with an I-frame;
 determining an average byte size of the I frames of the plurality of video chunks, the average I-frame byte size being based on a bitrate speed of the video file;

retrieving a portion equal to the average I-frame byte size from the beginning of each one of the plurality of video chunks of the video file;
receiving a begin trick play request of the selected video file; and
initiating trick play of the selected video file, wherein trick play of the video file includes displaying each portion of each one of the plurality of video chunks of the video file.

2. The method according to claim 1, comprising:
receiving an end trick play request of the selected video file; and
terminating trick play of the selected video file.

3. The method of claim 1, wherein the selected video file is stored on the HLS server in one or more versions, each version having a different bitrate speed.

4. The method of claim 1, wherein retrieving the selected video files includes:
determining a user device bandwidth; and
retrieving a first version of the selected video file having a first bitrate speed based on the user device bandwidth.

5. The method of claim 4, comprising:
detecting a change in the bandwidth of the user device; and
retrieving a second version of the selected video file having a second bitrate speed.

6. The method of claim 1, wherein determining an average size of the plurality of I-frames comprises:
calculating a cumulative distribution function for a bitrate speed of the selected video file.

7. The method of claim 1, wherein the average I-frame byte size is at least 95% of the actual I-frame byte size of each I-frame in each of the plurality of video chunks.

8. A system for trick play using partial video file chunks, the system comprising:
one or more processors, one or more computer-readable memories, one or more computer-readable tangible storage devices, and instructions stored on at least one of the one or more storage devices for execution by at least one of the one or more processors via at least one of the one or more memories, the instructions comprising:
instructions to receive a video file selection for display on a user device, wherein the video file is an HTTP Live Streaming (HLS) based video file;
instructions to retrieve the selected video file from an HLS server, the video file having a plurality of video chunks, and each one of the video chunks beginning with an I-frame;
instructions to determine an average byte size of the I frames of the plurality of video chunks, the average I-frame byte size being based on a bitrate speed of the video file;
instructions to retrieve a portion equal to the average I-frame byte size from the beginning of each one of the plurality of video chunks of the video file;
instructions to receive a begin trick play request of the selected video file; and
instructions to initiate trick play of the selected video file, wherein trick play of the video file includes displaying each portion of each one of the plurality of video chunks of the video file.

9. The system according to claim 6, comprising:
instructions to receive an end trick play request of the selected video file; and
instructions to terminate trick play of the selected video file.

10. The system of claim 6, wherein the selected video file is stored on the HLS server in one or more versions, each version having a different bitrate speed.

11. The system of claim 6, wherein the instructions to retrieve the selected video files includes:
instructions to determine a user device bandwidth; and
instructions to retrieve a first version of the selected video file having a first bitrate speed based on the user device bandwidth.

12. The method of claim 11, comprising:
instructions to detect a change in the bandwidth of the user device; and
instructions to retrieve a second version of the selected video file having a second bitrate speed.

13. The system of claim 6, wherein the instructions to determine an average size of the plurality of I-frames comprises:
instructions to calculate a cumulative distribution function for a bitrate speed of the selected video file.

14. The system of claim 8, wherein the average I-frame byte size is at least 95% of the actual I-frame byte size of each I-frame in each of the plurality of video chunks.

15. A computer program product for trick play using partial video file chunks, the computer program product comprising:
a non-transitory computer-readable storage medium having program instructions embodied therewith, the program instructions executable by a computer to cause the computer to perform a method, comprising:
receiving a video file selection for display on a user device, wherein the video file is an HTTP Live Streaming (HLS) based video file;
retrieving the selected video file from an HLS server, the video file having a plurality of video chunks, and each one of the video chunks beginning with an !-frame;
determining an average byte size of the I frames of the plurality of video chunks, the average I-frame byte size being based on a bitrate speed of the video file;
retrieving a portion equal to the average I-frame byte size of from the beginning of each one of the plurality of video chunks of the video file;
receiving a begin trick play request of the selected video file; and
initiating trick play of the selected video file, wherein trick play of the video file includes displaying each portion of each one of the plurality of video chunks of the video file.

16. The computer program product according to claim 15, comprising:
receiving an end trick play request of the selected video file; and
terminating trick play of the selected video file.

17. The computer program product of claim 15, wherein the selected video file is stored on the HLS server in one or more versions, each version having a different bitrate speed.

18. The computer program product of claim 15, wherein retrieving the selected video files includes:
determining a user device bandwidth; and
retrieving a first version of the selected video file having a first bitrate speed based on the user device bandwidth.

19. The computer program product of claim 18, comprising:
detecting a change in the bandwidth of the user device; and
retrieving a second version of the selected video file having a second bitrate speed.

20. The computer program product of claim 15, wherein determining an average size of the plurality of I-frames comprises:
  calculating a cumulative distribution function for a bitrate speed of the selected video file.

* * * * *